June 18, 1940.  W. H. BONHAM  2,205,029
MACHINE FOR FORMING TUBULAR BODIES
Filed Dec. 10, 1937  4 Sheets-Sheet 1
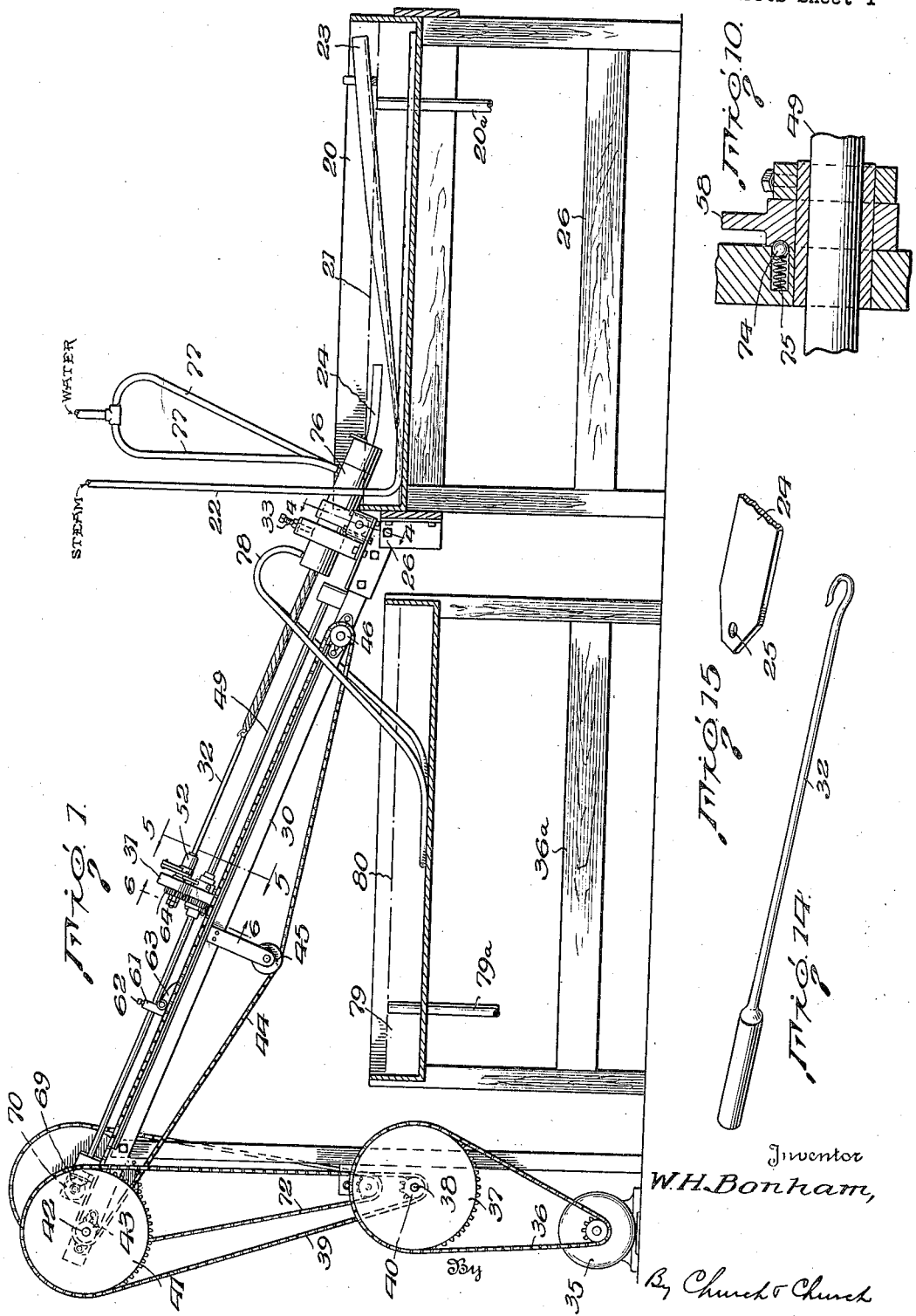
Inventor
W. H. Bonham,
By Church & Church
His Attorneys

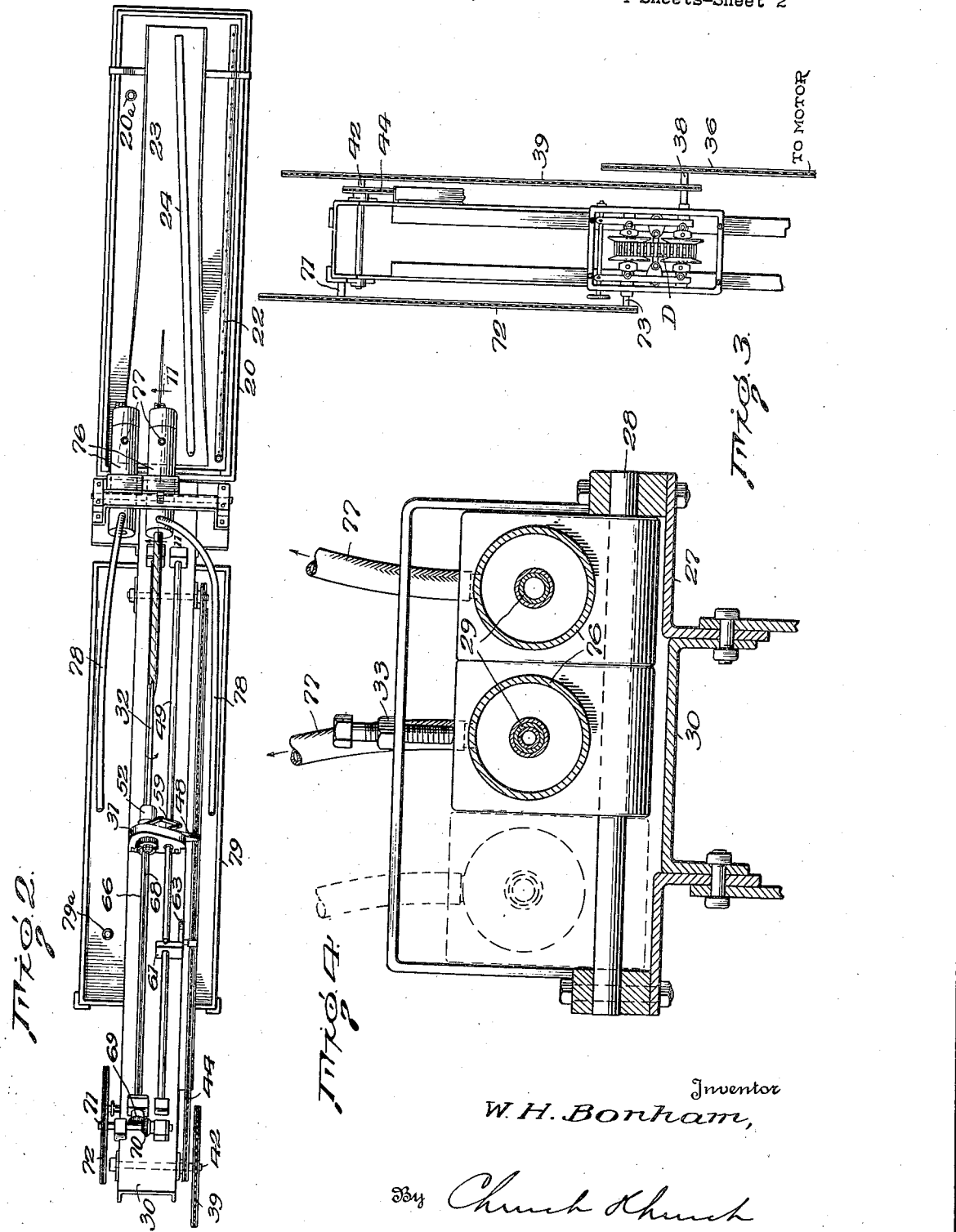

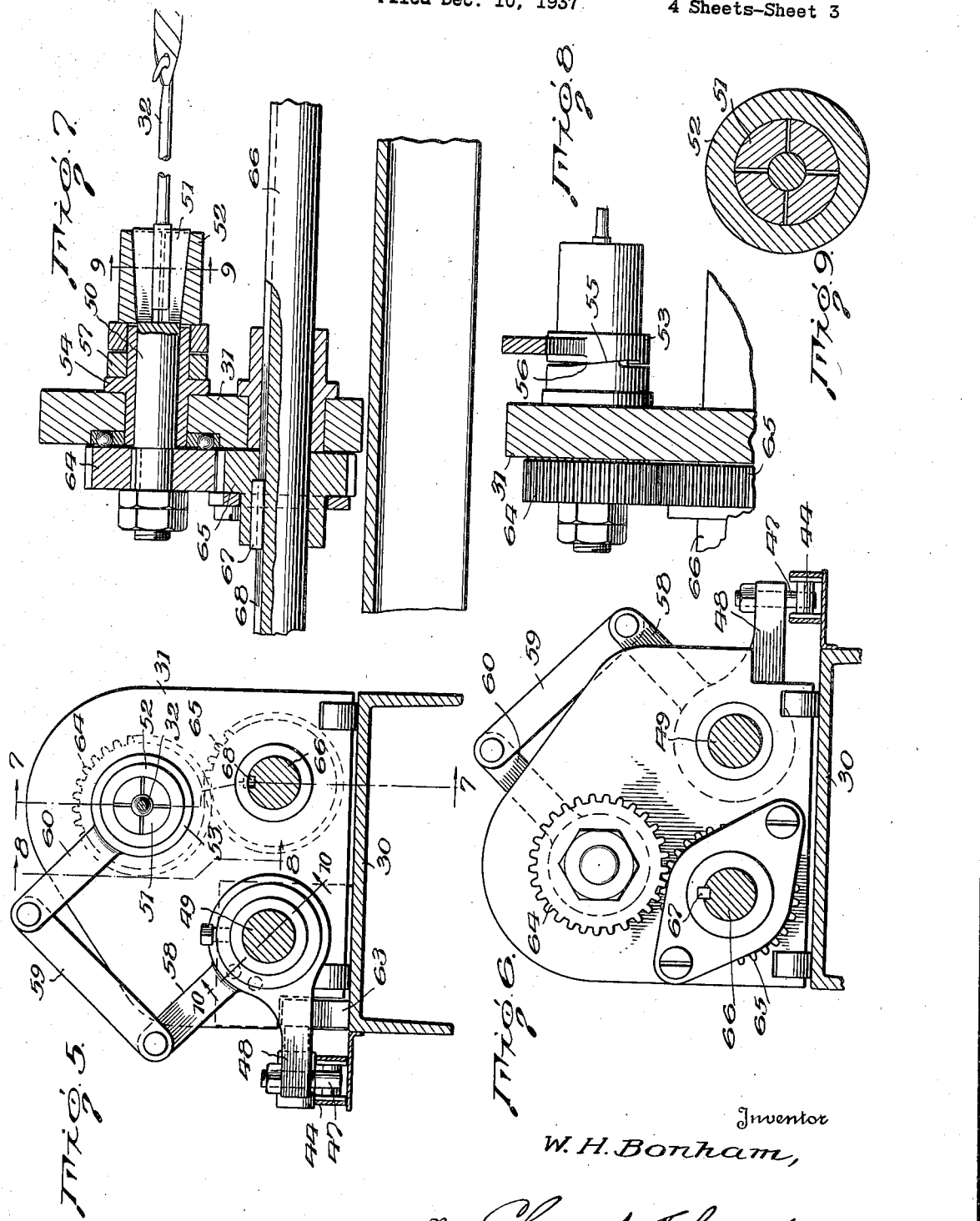

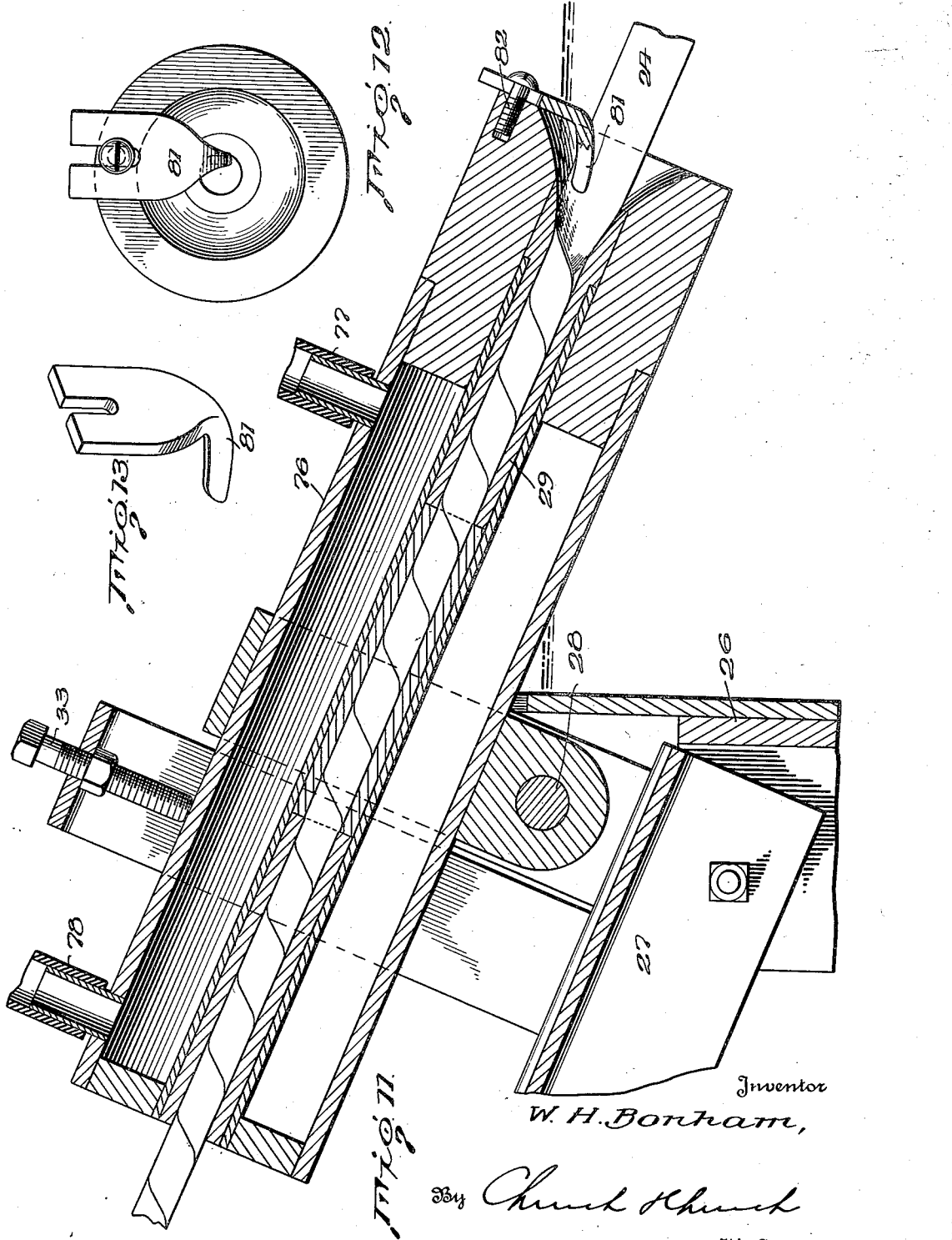

Patented June 18, 1940

2,205,029

UNITED STATES PATENT OFFICE 2,205,029

MACHINE FOR FORMING TUBULAR BODIES

William H. Bonham, Metuchen, N. J., assignor to Nixon Nitration Works, Nixon, N. J., a corporation of New Jersey Application December 10, 1937, Serial No. 179,204

10 Claims. (Cl. 18—19)

This invention relates to a machine for producing tubular bodies formed of strip material, and particularly, thermoplastic strip material such as pyroxylin or similar cellulose material.

One object of the invention is to provide a comparatively inexpensive machine, simple but efficient in its operation in forming tubes of spirally coiled strips.

A further object is to provide a machine in which the strips of material will be spirally coiled into tubular formation entirely mechanically.

In carrying out the invention, the strip is pulled or drawn through a forming tube by a rotatable rod secured on a carriage and another object is to provide means for mechanically moving the carriage and rod relatively to the forming tube in one direction, while permitting them to move in the opposite direction by gravity.

A still further object is to provide a machine having a plurality of forming tubes associated with a single carriage in which the strip-engaging rod is detachably secured whereby, during the coiling of one strip through one tube, a second strip and rod can be prepared for the coiling operation in another tube.

Another object is to provide means for releasing the rotating rod from the carriage at a predetermined point from the former tube.

Another object is to provide means for automatically arresting movement of the carriage at a predetermined point from the forming tube, said means preferably also being employed for actuating the rod-releasing means previously referred to.

A still further object is to provide means whereby the speed of rotation of the strip-engaging rod may be varied, depending upon the width of the strip being coiled.

Another object is to provide means for preventing coiling or twisting of the strip material exteriorly of the end of the forming tube at which the strip enters.

A still further object of the invention is to provide a forming tube which will insure a close fit between the abutting edges of the spiralled strip.

Another object is to provide a machine of the type indicated, wherein the entrance end of the forming tube is heated, preferably by the bath used for softening the thermoplastic strips preparatory to their being wrapped, the tube, beyond said entrance portion being provided with means for chilling and fixing the strip after it is coiled into tubular formation.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 is a side elevational view of apparatus embodying the present improvements;

Fig. 2 is a top plan view thereof;

Fig. 3 is a rear end elevation to illustrate the drive connections, the other portions of the apparatus being omitted;

Fig. 4 is a transverse vertical section on the line 4—4 of Fig. 1;

Fig. 5 is a similar view on the line 5—5 of Fig. 1;

Fig. 6 is a like view on the line 6—6 of Fig. 1, this view being taken in a direction opposite to that of Fig. 5;

Fig. 7 is a vertical sectional view on the line 7—7 of Fig. 5;

Fig. 8 is a similar view on the line 8—8 of Fig. 5;

Fig. 9 is a transverse sectional view on the line 9—9 of Fig. 7;

Fig. 10 is a sectional view on the line 10—10 of Fig. 5;

Fig. 11 is a longitudinal vertical sectional view on the line 11—11 of Fig. 2;

Fig. 12 is an elevational view of the end of one of the forming tubes at which the strip of material enters the tube;

Fig. 13 is a detail perspective view of what might be termed the anti-twisting member;

Fig. 14 is a detail perspective view of one of the rods for engaging and pulling the strips of material through the forming tubes; and Fig. 15 is a detail perspective view of an end portion of one of the strips of material.

Generally speaking, the apparatus comprises a forming tube through which the strips of thermoplastic material, such as pyroxylin or other cellulose material which has been previously softened in a heated bath, are pulled by means which are rotatable so as to twist the strips and coil them spirally into a tubular body as they pass through the forming tube.

In the form of apparatus illustrated, a tank 20 is partially filled with water to a level indicated at 21, and the water is heated by steam supplied through a pipe 22. The strips of material to be coiled into tubular formation are supported on an inclined platform 23, the lower end of the platform being submerged, so that the ends of the strips which are perforated will be submerged in the heated bath. One of the strips is shown at 24 (Fig. 15), the end of the strip being perforated as at 25 for purposes which will presently appear. The tank 20 is supported on a frame 26 and, at one end of the frame, there is a bracket 27 having a cross bar 28 therein on which a plurality of forming tubes 29 are mounted to slide transversely of the frame. These forming tubes are inclined, so that they are submerged at one end in the heated bath in tank 20. Inclined upwardly from frame 27 is a bed plate 30 supporting a carriage 31, in which a strip-engaging member, preferably such as the hook 32 illustrated in Fig. 14, is adapted to be releasably secured. Carriage 31 is adapted to move toward and from the tubes 29 and, by having the tubes slidably mounted in the supplemental frame 27, any one of said tubes may be secured by locking screw 33 in a position where the bore thereof will be in registry with the hook member.

The apparatus is operated from a motor 35 through a drive chain 36, said chain driving a sprocket 37 on a shaft 38. A sprocket chain 39 engaging a sprocket 40 on shaft 38 transmits motion through sprocket 41 to a shaft 42 on which there is mounted a sprocket 43 for driving a chain 44 by which the carriage 31 is moved along the ways 30. Chain 44 is supported by idlers 45, 46, the upper reach of the chain being adapted to be engaged by a pin 47 on a trip lever 48 journaled on a rod 49 extending through the carriage 31.

Journaled in the upper portion of the carriage 31 is a stub shaft 50 having one end split to form a plurality of segments 51 which can be contracted by a sleeve 52 to grip the butt end of the hook member 32 in the comparatively small bore formed in the split end portion of said shaft. Referring particularly to Figs. 5 to 9, the split end portion of shaft 50 is tapered and the interior of sleeve 52 is similarly shaped, so that, in sliding the sleeve in one direction, the segments can be contracted to grip the hook member 32, while movement of the sleeve in the opposite direction will release the hook. Movement of sleeve 52 to contract the shaft segments 51 is obtained by means of an annular member 53 journaled on a bushing 54 on shaft 50 and provided with a cam surface 55 adapted to ride on a cam surface 56 on a second ring member 57 on said bushing. Trip lever 48, journaled on rod 49, has a hub portion on which is formed an arm 58, which is connected by a link 59 to an arm 60 on the ring member 53, so that when trip lever 48 is raised, as viewed in Fig. 5, the rotary motion of its hub portion will transmit, through arm 58, link 59 and arm 60, rotary motion to the ring member 53 and, of course, when trip lever 48 is moved downwardly, the ring member 53 will be rotated in the opposite direction. The trip lever is frictionally retained in either its raised or lowered position by balls 74 which are urged by spring 75 into a recess formed in the hub portion of said trip lever.

Slidable on rod 49, and resting on bed plate 30, is a block 61 adapted to be fixed with respect to the rod by a set screw 62. Pivoted on said block 61 is a cam member 63, over which the trip lever 48 is adapted to ride at a predetermined point in the movement of the carriage 31 away from the forming tubes 29, the engagement of the trip member with said cam 63 elevating the same so as to disengage the pin 47 from the drive chain 44 and, as just last described, to rock arm 58 and rotate the ring 53 by which the hook member 32 is secured in the split end portion of shaft 50.

To impart rotary motion to shaft 50 and the hook member 32 when the latter is secured therein, a gear 64 on shaft 50 meshes with a gear 65 on a shaft 66 extending through the carriage longitudinally of the way bed 30. The carriage is slidable on shaft 66, but rotary motion is imparted by the shaft to the gear 65 by reason of the key 67 slidable in a longitudinal slot 68 in said shaft. At its upper extremity, shaft 66 is provided with a bevel gear 69 meshing with a similar gear 70 on a shaft 71 and said shaft 71 is driven by a sprocket chain 72 from a shaft 73 (Fig. 3). The speed at which the hook member 32 in shaft 50 is rotated is dependent upon the width of the strip being wrapped and for this reason a differential drive indicated at D is interposed between shaft 38 and shaft 73. A detailed description of said drive is unnecessary in the present instance, as it forms no part of the present invention, and it is believed to be sufficient to state it is the type and substantially the same construction, as is shown in United States Letters Patent No. 1,626,584, granted April 26, 1927.

As previously mentioned, the lower extremities of the forming tubes are submerged in the heated bath in tank 20, but the upper portions of said tubes are provided with jackets 76 through which water from pipes 77 is circulated for the purpose of chilling the upper portions of the forming tubes and thus setting, at least to a limited extent, the thermoplastic material in its spirally coiled condition before it leaves the forming tube. The water is exhausted from the jackets 76 through pipes 78 and discharged into a tank 79, the water being retained in the tank 79 to approximately the level indicated at 80, so that as the coiled tubes are removed from the hooks 32 they may be immersed in the bath of cold water and hardened. In order to prevent the strip of thermoplastic material twisting exteriorly of the forming tube, each tube is provided at its entrance end with a guide 81, against which the strip engages as it enters the flared mouth of the tube. If desired, this guide may be secured to the end of the tube structure by a screw 82.

Tank 79 is supported on frame 26a and the level of the liquid in each of tanks 79 and 21 is maintained at the proper height by the location of the upper extremities of the discharge pipes 79a, 20a, of said tanks.

The operation of the machine is as follows:
Assuming the several parts to be in the position illustrated in Fig. 1, after the carriage 31 has been moved by the drive chain 44 to a point where trip lever 48 engages the cam member 63, the trip lever will be raised to disengage pin 47 from the drive chain and to rotate ring 53 to release the contracted split end portion of shaft 50, whereupon the operator can remove the hook member 32 from said shaft 50. At this time, the right-hand forming tube of Fig. 4 will have been positioned to one side of the bed 30 and, during the forming of the tube body illustrated in the drawings, the operator will have manually inserted another hook member 32 through the right-hand forming tube and attached thereto a second strip of the thermoplastic material. As a consequence, when the previously used hook member has been released and removed by the attendant, as just described, the carriage, with the pin 47 disengaged from the drive chain, slides down, by gravity, toward the forming tubes. The operator will preferably retard this movement of the carriage in order to prevent injury thereto and, during this time, he will shift or adjust the two forming tubes to bring the right-hand tube of Fig. 4 into registry with the shaft 50 in the carriage, so that the butt end of the second hook member 32, which was previously inserted in the right-hand tube, can then be secured in the split end of shaft 50. This is accomplished by the operator moving the trip lever 48 downwardly, and, as will be understood, this downward movement of the trip lever re-engages pin 47 with drive chain 44, so that the carriage is again moved away from the forming tube to draw the second strip of thermoplastic material from the heated bath in tank 21 through the tube, the rotary motion of the hook member through shaft 50 spirally coiling the strip as it passes through the tube. As previously described, the lower ends of the tubes are submerged in a heated bath, so that the strip retains its pliability during the initial portion of its movement through the forming tube but, as also described, the chilled upper portion of the tube causes the spirally coiled material to retain its tubular form sufficiently to permit it to be removed from the hook by the operator and placed in the bath in tank 79. The second position of the two forming tubes is indicated by the showing of one of the tubes in dotted lines in Fig. 4. In other words, when the tubes, as illustrated in Fig. 4, are shifted to the left for the second cycle of operations, the left-hand tube of the pair of tubes will take the position indicated in dotted lines and the right-hand tube will be positioned with its bore in registry with the socketed end of shaft 50.

What I claim is:

1. In a machine for forming tubular bodies of spirally coiled strip material, a forming tube, a carriage, means for propelling said carriage toward and from said tube, a strip-engaging member secured in said carriage in registry with said tube, means for rotating said member, and means for disengaging said carriage and its propelling means at a predetermined distance from said tube.

2. In a machine for forming tubular bodies of spirally coiled strip material, a forming tube, a carriage movable toward and from said tube, a strip-engaging member releasably secured in said carriage in registry with said tube, means for rotating said member, and means for releasing said member from the carriage at a predetermined point from said tube.

3. In a machine for forming tubular bodies of spirally coiled strip material, a forming tube, a carriage, means for propelling said carriage toward and from said tube, a strip-engaging member releasably secured in said carriage in registry with said tube, means for rotating said member, and means disengaging said carriage and its propelling means and for releasing said member from the carriage.

4. In a machine for forming tubular bodies of spirally coiled strip material, a heated bath, a forming tube positioned with one end submerged in said bath, a strip-engaging rod, means for moving said rod longitudinally through said tube whereby a strip engaged by said rod is drawn from said bath through said tube, means for rotating said rod, and means adjacent the submerged end of the tube for preventing twisting of the strip exteriorly of said end of the tube.

5. In a machine for forming tubular bodies of spirally coiled strip material, a heated bath, a forming tube, a strip-engaging rod, means for moving said rod through said tube whereby a strip engaged by the rod can be drawn from the bath through the tube, means for rotating said rod, and means engageable with the strip beyond the end of the rod as the strip enters said tube for preventing twisting of the strip exteriorly of the tube.

6. In a machine for forming tubular bodies of spirally coiled strip material, a forming tube, a carriage, a strip-engaging rod releasably secured in said carriage, means for rotating said rod, a drive chain, a trip lever on said carriage engageable with said chain for moving said carriage away from said forming tube, and means for tripping said lever and disengaging the same from said chain.

7. In a machine for forming tubular bodies of spirally coiled strip material, a forming tube, a carriage, a rotatable shaft in said carriage, a rod clamped in said shaft, means for moving said carriage away from said tube, a trip lever, means actuated by said lever for releasing said rod from said shaft.

8. In a machine for forming tubular bodies of spirally coiled strip material, a forming tube, a carriage, means for moving said carriage axially of the tube, a rotatable shaft in said carriage, said shaft having a split, expansible end portion, a strip-engaging rod, means for clamping said rod in the split end of said shaft, and means for releasing said clamping means.

9. In a machine for forming tubular bodies of spirally coiled strip material, a forming tube, a carriage, means for moving said carriage axially of the tube, a rotatable shaft in said carriage, said shaft having a split, expansible end portion, a strip-engaging rod, means for clamping said rod in the split end of said shaft, a trip lever on said carriage, means operable by said lever for releasing said rod clamping means, and a trip engageable by said lever during travel of the carriage away from the forming tube.

10. In a machine for forming tubular bodies of spirally coiled strip material, a forming tube, a carriage, means for moving said carriage axially of the tube, a rotatable shaft in said carriage, said shaft having a split, expansible end portion, a strip-engaging rod, a clamping ring for clamping said rod in the split end of said shaft, a trip lever, means operable by said lever for releasing said clamping ring, and a trip for actuating said trip lever.

WILLIAM H. BONHAM.